United States Patent
Cook et al.

(10) Patent No.: US 11,551,103 B2
(45) Date of Patent: Jan. 10, 2023

(54) DATA-DRIVEN ACTIVITY PREDICTION

(71) Applicant: Washington State University, Pullman, WA (US)

(72) Inventors: Diane J. Cook, Pullman, WA (US); Bryan Minor, Pullman, WA (US); Janardhan Rao Doppa, Pullman, WA (US)

(73) Assignee: Washington State University, Pullman, WA (US)

( * ) Notice: Subject to any disclaimer, the term of this patent is extended or adjusted under 35 U.S.C. 154(b) by 124 days.

(21) Appl. No.: 16/583,714

(22) Filed: Sep. 26, 2019

(65) Prior Publication Data

US 2020/0019887 A1 Jan. 16, 2020

Related U.S. Application Data

(62) Division of application No. 15/294,509, filed on Oct. 14, 2016, now abandoned.

(60) Provisional application No. 62/242,654, filed on Oct. 16, 2015.

(51) Int. Cl.
*G06N 5/02* (2006.01)
*G06N 20/00* (2019.01)

(52) U.S. Cl.
CPC ............... *G06N 5/02* (2013.01); *G06N 20/00* (2019.01)

(58) Field of Classification Search
CPC .................................. G06N 20/00; G06N 5/02
See application file for complete search history.

(56) References Cited

U.S. PATENT DOCUMENTS

| | | | |
|---|---|---|---|
| 2009/0077000 A1* | 3/2009 | Begole | G06Q 30/02 706/54 |
| 2010/0063774 A1* | 3/2010 | Cook | G05B 15/02 702/181 |
| 2013/0238538 A1* | 9/2013 | Cook | G06N 20/00 706/20 |
| 2015/0156031 A1* | 6/2015 | Fadell | G08B 19/005 700/276 |
| 2015/0227118 A1 | 8/2015 | Wong | |
| 2015/0324698 A1* | 11/2015 | Karaoguz | H04L 67/22 706/46 |
| 2015/0364057 A1* | 12/2015 | Catani | G16H 20/30 434/127 |

(Continued)

OTHER PUBLICATIONS

Mousavi et. al., "A new support vector model-based imperialist competitive algorithm for time estimation in new product development projects", 2012 (Year: 2012).*

(Continued)

*Primary Examiner* — Omar F Fernandez Rivas
*Assistant Examiner* — Selene A. Haedi
(74) *Attorney, Agent, or Firm* — Lee & Hayes, P.C.

(57) ABSTRACT

A physical environment is equipped with a plurality of sensors (e.g., motion sensors). As individuals perform various activities within the physical environment, sensor readings are received from one or more of the sensors. Based on the sensor readings, activities being performed by the individuals are recognized and the sensor data is labeled based on the recognized activities. Future activity occurrences are predicted based on the labeled sensor data. Activity prompts may be generated and/or facility automation may be performed for one or more future activity occurrences.

21 Claims, 9 Drawing Sheets

(56) References Cited

U.S. PATENT DOCUMENTS

| | | | |
|---|---|---|---|
| 2017/0032248 A1* | 2/2017 | Dotan-Cohen | H04L 67/306 |
| 2017/0109656 A1 | 4/2017 | Cook et al. | |
| 2017/0124288 A1* | 5/2017 | Gundlapalli | G16H 20/60 |
| 2018/0190382 A1* | 7/2018 | Ramezani | G06N 5/003 |

OTHER PUBLICATIONS

Rai et. al., "Simultaneously Leveraging Output and Task Structures for Multiple-Output Regression", Dec. 2012 (Year: 2012).*
Holder et. al., "Automated Activity-aware Prompting for Activity Initiation", Mar. 2013 (Year: 2013).*
Ross et. al. "Learning Monocular Reactive UAV Control in Cluttered Natural Environments", May 2013 (Year: 2013).*
Sehili et. al., "Sound Environment Analysis in Smart Home", 2012 (Year: 2012).*
Bagnell, "An Invitation to Imitation", Mar. 2015 (Year: 2015).*
Kim et. al., "Maximum Mean Discrepancy Imitation Learning", 2013 (Year: 2013).*
Boger et al. "A Decision-Theoretic Approach to Task Assistance for Persons with Dementia," In International Joint Conference on Artificial Intelligence, pp. 1293-1299, 2005.
Bulling et al. "A tutorial on human activity recognition using body-worn inertial sensors," ACM Computing Surveys, 46:107-140, 2015.
Cook et al., "Activity discovery and activity recognition: A new partnership," IEEE Transactions on Systems, Man, and Cybernstics, Part B, 43(3):820-828, 2013.
Cook et al. "Learning setting-generalized activity models for smart spaces," IEEE Intelligent Systems, 27(1):32-38, 2012.
Doppa et al. "HC-Search: A learning framework for search-based structured prediction," JAIR, 50:369-407, 2014.
Doppa et al. "HC-Search for Multi-Label Prediction: An Empirical Study," In AAAI, 2014, 7 pages.
Doppa, "Structured prediction via output space search," JMLR, 15:1317-1350, 2014.
Epstein et al, "Use of technological prompting device to aid a student with attention deficit hyperactivity disorder to initiate and complete daily activities: An exploratory study." Journal of Special Education Technology, 16:19-28, 2001.
Gopalratnam et al. "Online sequential prediction via incremental parsing: The active lezi algorithm," IEEE Intelligent Systems, 22:52-58, 2007.
Gwet et al. "Handbook of Inter-Rater Reliability," Advanced Analytics, LLC, 2014, 38 pages.
Hal Daume III et al. "Search-based structured prediction," MLJ, 75(3):297-325, 2009.
Hawkins et al. "Probabilistic human action prediction and wait-sensitive planning for responsive human-robot collaboration," In IEEE-RAS International Conference on Humanoid Robots, pp. 499-506, 2013.
Heron et al. "Ecological momentary interventions: Incorporating mobile technology into psychosocial and health behavior treatment," Journal of Health Psychology, 15:1-39, 2010.
Kaariainen et al. "Lower bounds for reductions," In Atomic Learning Workshop, 2006, 32 pages.
Kaushik et al. "User-adaptive reminders for home-based medical tasks: A case study," Methods of Information in Medicine, 47:203-207, 2008.
Ke et al. "A review on video-based human activity recognition," Computers, 2(2):88-131, 2013.
Khardodn et al. "Learning to take actions," MLJ, 35(1):57-90, 1999.
Kitani et al. "Activity forecasting," In Proceedings of the European Conference on Computer Vision, 2012, 14 pages.
Koppula et al. "Anticipating human activities using object affordances for reactive robotic response" In Robotics: Sciences and Systems, 2013, 14 pages.
Krishnan et al. "Activity recognition on streaming sensor data," Pervasive and Mobile Computing, 10:138-154, 2014.
Lafferty et al. "Conditional random fields: Probabilistic models for segmenting and labeling sequence data," In ICML, pp. 282-289, 2001.
Lam et al. "HC-Search for structured prediction in computer vision," In CVPR, 2015, 10 pages.
Lam et al. "Learning to detect basal tubules of nematocysts in sem images," In ICCV Workshop on Computer Vision for Accelerated Biosciences, 2013, 7 pages.
Lara et al. "Survey on human activity recognition using wearable sensors," IEEE Communication Survey Tutorials, 15:1195-1209, 2013.
Ma et al. "Prune-and-Score: Learning for greedy conference resolution," In EMNLP, 2014, 12 pages.
Minor et al., "Regression Tree Classification for Activity Prediction in Smart Homes," AwareCast Conference, Sep. 14, 2014, 10 pages.
Office Action for U.S. Appl. No. 15/294,509, dated Jun. 28, 2019, Cook, "Data-Driven Activity Prediction," 16 pages.
Ross et al. "A reduction of imitation learning and structured prediction to no-regret online learning," In AISTATS, 2011, 9 pages.
Schmitter-Edgecome et al. "Dyadic interventions for Persons with Early Stage Dementia A Cognitive Rehabilitative Focus," Nova Science Publishers, 2009, pp. 39-56.
Stowell et al. "Segregating event streams and noise with a Markov renewal process model," Journal of Machine Learning Research, 14:2213-2238, 2013.
Wadley, "Mild cognitive impairment and everyday function: Evidence of reduced speed in performing instrumental activities of daily living.," The American Journal of Geriatric Psychiatry, 15:416-424, 2008.
Xie et al. "Learning greedy policies for the easy-first framework," In AAAI, 2015, 7 pages.
Ye et al. "KCAR A knowledge-driven approach for concurrent activity recognition," Pervasive and Mobile Computing, 19:47-70, 2015.
Zheng et al. "Physical activity recognition from accelerometer data using a multi-scale ensemble method," In Proceedings of the Innovative Applications of Artificial Intelligence Conference, pp. 1575-1581, 2013.

* cited by examiner

DATA-DRIVEN ACTIVITY PREDICTION

RELATED APPLICATION

This application is a divisional of and claims priority to U.S. patent application Ser. No. 15/294,509, filed on Oct. 14, 2016, the disclosure of which claims the benefit of U.S. Provisional Application No. 62/242,654, filed Oct. 16, 2015, all of which are hereby incorporated by reference.

STATEMENT CONCERNING GOVERNMENT INTEREST

The invention described herein was developed based on work supported by the National Science Foundation under grants 0900781, 1262814, and 1543656, and by the National Institute of Biomedical Imaging and Bioengineering under grant R01EB015853. Accordingly, the Government may have certain rights in this application.

BACKGROUND

Smart environments (e.g., homes or other environments fitted with a plurality of sensors) are currently being used for a variety of uses including, for example, medical monitoring, energy efficiency, and ubiquitous computing applications. Using smart environments, sensor data can be gathered and analyzed to recognize activities (e.g., activities of daily living), and this activity data can be used in various applications including, for example, security systems and computer games. Activity recognition focuses on identifying and labeling activities that have occurred in the past or may be occurring in the present.

Activity recognition data can be used to consider activity prediction and activity prompting. Existing activity prediction techniques are typically implemented to predict the next activity that will occur within a smart environment. Existing activity prompting applications typically require manual input of a user's daily schedule or predefined activity steps.

SUMMARY

In a smart environment (e.g., a home or other environment fitted with a plurality of sensors) equipped with various types of sensors, activities performed by individuals within the smart environment can be recognized. Based upon sensor data gathered from the smart environment and the recognized activities, future occurrences of one or more activities within the smart environment can be predicted. Having the predicted future occurrences of one or more activities can further enable an activity prompting application, which can be used to prompt individuals (e.g., individuals with memory impairment) associated with the smart environment to perform particular activities at the predicted activity occurrence times. In addition, facility automation in support of predicted activities may also be implemented.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The various features described herein may, for instance, refer to device(s), system(s), method(s), and/or computer-readable instructions as permitted by the context above and throughout the document.

BRIEF DESCRIPTION OF THE DRAWINGS

The Detailed Description below is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
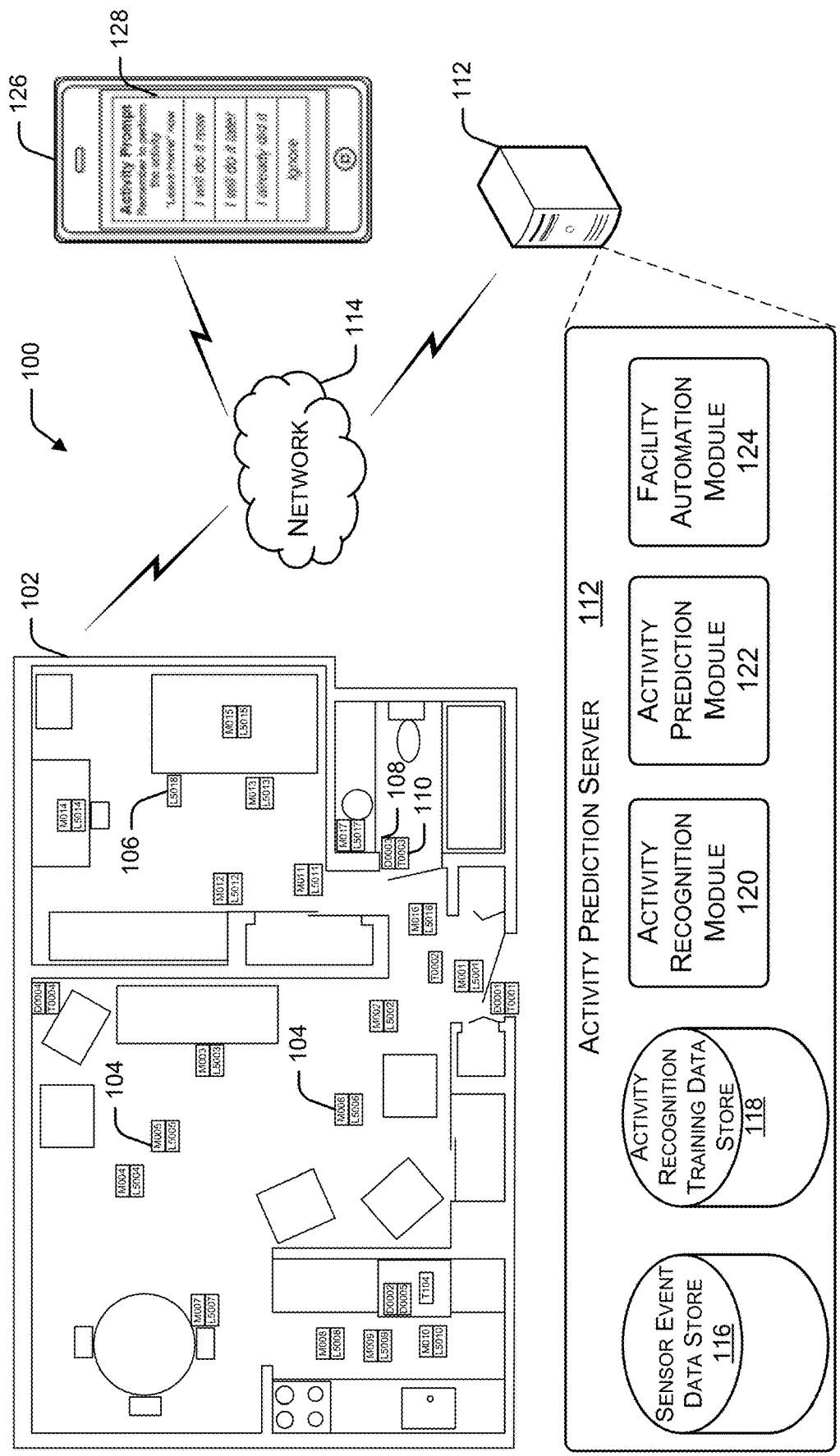
FIG. 1 is a pictorial diagram of an example implementation environment.

The data-driven activity prediction techniques described herein utilize activity-labeled sensor events to learn an individual's normal routine and generate predictions based upon received and labeled sensor event data. The predictions include predicted times of next activities and can also be used to support an activity prompting application.

Smart environments include homes, apartments, workplaces, and other types of spaces that are equipped with any of a variety of types of sensors, controllers, and a computer-driven decision making process. Such smart environments enable ubiquitous computing applications including, for example, applications to support medical monitoring, energy efficiency, assistance for disabled individuals, monitoring of aging individuals, or any of a wide range of medical, social, or ecological issues. The types of sensors that may be employed to establish a smart environment may include, for example, wearable sensors that are attached to a particular user, cameras, microphones, or less obtrusive sensors (e.g., motion sensors, door sensors, temperature sensors, etc.) that are placed at various locations within the environment.

Many smart environments enable the ability to detect, track, and identify residents, as well as recognize specific activities. Examples of specific activities that may be recognized include, but are not limited to, sleeping, bathing, bed-to-toilet transition, grooming, preparing/eating breakfast, watching TV, cleaning the bathroom, working at the computer, preparing/eating lunch, preparing/eating dinner, cleaning the apartment, or studying. Activity recognition may be implemented, for example, by comparing a pattern or sequence of detected actions with predetermined patterns or sequences of actions corresponding to known activities. In an example implementation, the activities that are identified may include well-known ADLs (Activities of Daily Living). In another implementation, the activities that are identified may also include additional activities that are not included in a list of ADLs, but that occur on a frequent basis.

Activity prediction, i.e., using sensor data to predict future activity occurrence times, is valuable for providing activity-aware services such as energy-efficient home automation, prompting-based interventions, and anomaly detection. However, while various techniques exist to identify past and/or present activities based on sensor data, there are various challenges in predicting future activity times. For example, sensor data is typically noisy, activity labels provided by activity recognition algorithms are subject to error, and data describing recognized past and present activities contains spatial and temporal relationships that, if considered, may improve the accuracy of activity predictions.

This Detailed Description describes example techniques to analyze labeled sensor event data to generate predictions for future activity occurrence times. The techniques described herein include techniques to train an activity predictor and to use predicted activity occurrence times to generate activity prompts.

Example Environment

FIG. 1 illustrates an example implementation environment 100, which includes a smart environment 102. Example smart environment 102 includes various sensors such as, for example, motion sensors 104, light sensors 106, door sensors 108, and temperature sensors 110. Sensor event data is generated by the various sensors and transmitted to a computing device, such as activity prediction server 112, for example, over a network 114. Activity prediction server 112 may include, for example, sensor event data store 116, activity recognition training data 118, activity recognition module 120, activity prediction module 122, and facility automation module 124.

Example implementation environment 100 may also include a personal computing device 126, such as a mobile phone, which may also communicate via network 114. Example mobile phone 126 may include an activity prompting application 128.

Smart environment 102 is a single example of a smart environment, which includes motion sensors, light sensors, door sensors, and temperature sensors. However, in other examples, other combinations of these and other sensors may be used to implement a smart environment. Some other sensors that could be used to implement smart environments include, but are not limited to, for example, sound sensors, proximity sensors, or the like.

The network 114 may include any combination of wired and/or wireless networks. By way of example, the network 114 may include one or more personal area networks (PANs), home area networks (HANs), local area networks (LANs), and/or wide area networks (WANs).

In an example implementation, activity recognition module 120 is trained using activity recognition training data 118. Activity recognition training data 118 includes sensor data from smart environment 102 and/or sensor data from one or more other smart environments. Sensor events in the activity recognition training data 118 is labeled (e.g., by human annotators) to identify an activity that was occurring at the time the sensor event was recorded. In an example implementation, the labeled activities include bathe, bed-toilet transition, cook, eat, enter home, leave home, personal hygiene, relax, sleep, wash dishes, and work. Any combination of these or other activities may be reflected in the activity recognition training data 118. Various techniques for identifying and recognizing activities within a smart environment are described in additional detail in U.S. Pat. No. 8,417,481, filed Sep. 2, 2009 and issued Apr. 6, 2013, titled "Systems and Methods for Adaptive Smart Environment Automation," the contents of which are incorporated herein by reference.

Once trained using activity recognition training data 118, activity recognition module 120 recognizes activities that are performed within smart environment 102 based on data sent from the sensors 104, 106, 108, and 110 to the sensor event data store 116. Activity recognition module 120 labels the received sensor data with the recognized activity class.

Activity prediction module 122 analyzes sensor event data that has been labeled by activity recognition module 120, and predicts next occurrence times for one or more activities within the smart environment 102.

Facility automation module 124 may be configured to automatically control one or more aspects of the smart environment 102 based, at least in part, on the predicted next activity occurrence time. For example, based on a predicted "enter home" activity, facility automation module 124 may cause one or more lights to be turned on and/or may cause the temperature within the smart environment to be adjusted to a comfortable living temperature. As another example, based on a predicted "bed-to-toilet transition" activity facility automation module 124 may case a light in the bathroom to be turned on. Any number of automated controls for the smart environment 102 may be implemented in response to predicting a future activity occurrence.

Activity Prediction

Figure 2:
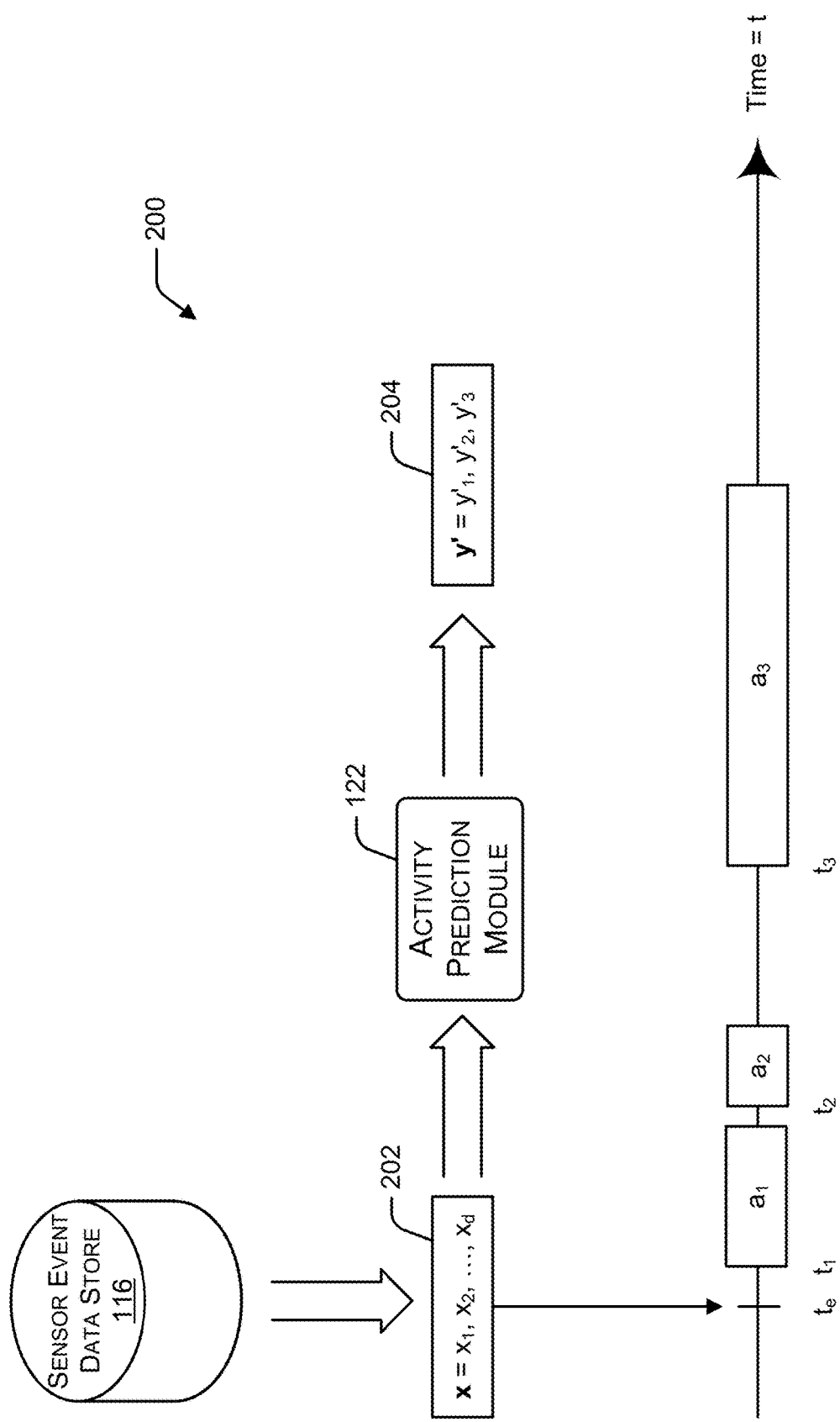
FIG. 2 is a pictorial diagram of an example data flow during activity occurrence prediction.

FIG. 2 illustrates an example data flow 200 for activity prediction as described herein. As described above, sensor data generated by the various sensors in the smart environment 102 is labeled by activity recognition module 120 and stored in the sensor event data store 116. At time $t=t_e$, sensor event features 202, $x=\{x_1, x_2, \ldots x_d\}$, are extracted from the sensor event data store 116 and sent as input to the activity prediction module 122. Activity prediction module 122 analyzes the received sensor event features 202 and generates output 204, which includes predictions of relative next occurrence times of one or more activities. In the illustrated example, output 204, $\hat{y}=\{\hat{y}_1, \hat{y}_2, \hat{y}_3\}$, represents respective predicted next occurrence times of three distinct activities, $a_1$, $a_2$, and $a_3$.

In the illustrated example, activity $a_1$ (e.g., eating) will actually occur at time $t_1$, activity $a_2$ (e.g., taking medication) will actually occur at time $t_2$, and activity $a_3$ (e.g., sleeping) will actually occur at time $t_3$. The output predictions 204 correspond to the actual activity times such that $\hat{y}_1$ is the prediction corresponding to actual time $t_1$, $\hat{y}_2$ is the prediction corresponding to actual time $t_2$, and $\hat{y}_3$ is the prediction corresponding to actual time $t_3$. In an example implementation, each prediction, $\hat{y}_i$, may be expressed as a specific time (e.g., $\hat{y}_1=t_1$) or as a number of time units that will pass until the activity occurs again (e.g., $\hat{y}_1=t_1-t_e$).

Activity Prompting

Figure 3:
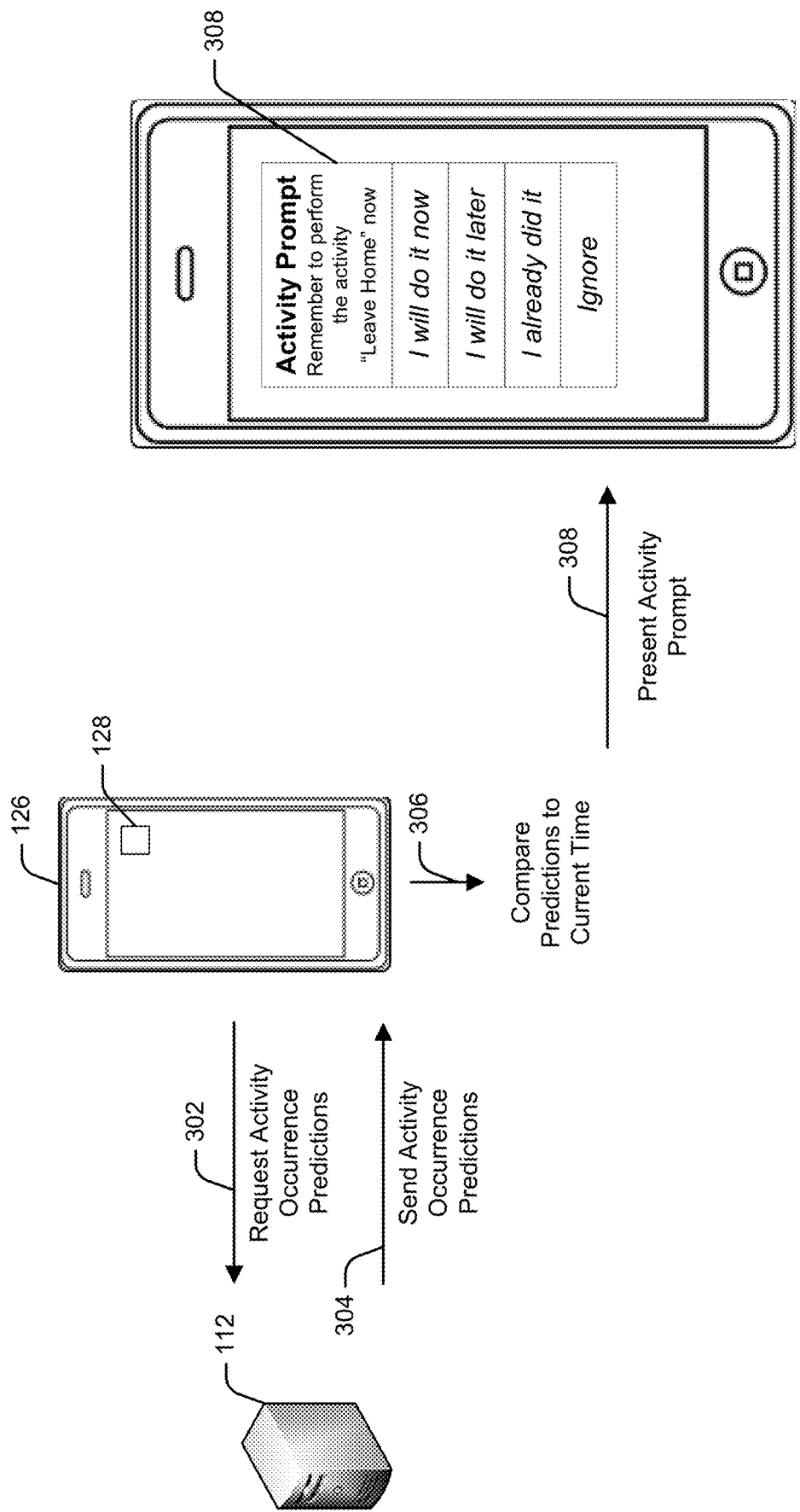
FIG. 3 is a pictorial diagram of an example data flow during data-driven activity prompting.

FIG. 3 illustrates an example data flow 300 between an example personal computing device 126 and example activity prediction server 112 to support activity prompting. In the illustrated example, personal computing device 126 (shown implemented as a mobile phone) includes an activity prompting application 128. Activity prompting application 128 configures the personal computing device 126 to periodically (e.g., every 15 minutes) request 302 from the activity prediction server 112, activity occurrence predictions. For example, a user may access the activity prompting application 128 to configure preferences, which may include a list one or more activities for which the user would like to be prompted. Alternatively, the activity prompting application 128 may be configured to request predictions and provide activity prompts for any activities that are recognized and predicted by activity prediction server 112.

Upon receiving a request for activity occurrence predictions, activity prediction server 112 sends 304 the requested activity occurrence predictions to the personal computing device. The activity occurrence predictions that are sent may include, for example, any activity occurrence predictions that have not already been sent, activity occurrence predictions that are within a threshold time range, occurrence predictions for specifically requested activities, and so on.

When the personal computing device 126 receives the requested occurrence predictions, the activity prompting application 128 compares 306 the received activity occurrence predictions to the current time. Based on the comparison, activity prompting application 128 generates and presents one or more activity prompts 308. For example, activity prompting application 128 may generate and presents a prompt 308 for an activity when the current time is greater than or equal to a predicted occurrence time for the activity. Alternatively, activity prompting application 128 may generate and presents a prompt 308 for an activity when the current time is within a threshold time period before and/or after the predicted occurrence time for the activity.

Upon receiving a prompt 308, a user may provide feedback indicating any action the user may be taking in response to the prompt. Such feedback may be recorded and later analyzed, for example, to determine the effectiveness of the activity prompts for that particular user.

Activity Prediction Techniques

Any number of techniques may be used to predict activity occurrence times. An independent activity predictor and a recurrent activity predictor are described herein.

Independent Activity Predictor

The independent activity predictor described herein does not take into account relationships between activities or the temporal structure of the sensor data, making predictions using only recent sensor events at a given time. In an example implementation, the independent activity predictor is trained using sensor event data in sensor event data store 116 that has been labeled with an activity class, for example, by activity recognition module 120. For each set of sensor event data X, in a training sequence A, features, $x_i = \Phi(\lambda_i) \in \mathfrak{R}^d$, are determined (i.e., input) and the ground-truth activity predictions, $y_i^* \in \mathfrak{R}^T$, (i.e., output) are extracted from the labeled activity segments. The aggregate set of input-output pairs $\{x_i, y_i^*\}_{i=1}^N$ (i.e., training examples) is given to a multi-output regression learner to learn the activity predictor by minimizing the given loss function L.

A weakness of the independent activity predictor is that the local sensor event data may not provide sufficient information to make highly-accurate activity predictions.

Recurrent Activity Predictor

To improve upon the independent activity predictor described above, a recurrent activity predictor is trained to consider joint models by reasoning over the relationships between different activities and accounting for the temporal structure of activities. In this example, activity prediction can be viewed as a generalization of sequence labeling, where each output token is a vector of T real values corresponding to the next activity occurrence time of each activity, where T is the number of activities.

A natural solution would be to define a graphical model encoding the relationships between input and output variables at different time steps and to learn the parameters from the training data. However, such a graphical model may be very complex (e.g., high tree width) and can pose severe learning and inference challenges. The model may be simplified to allow for tractable learning and inference, but that can be detrimental to prediction accuracy.

An alternate solution is to employ a heuristic inference method (e.g., loopy belief propagation or variational inference) with the complex model. However, with these solutions, it is very difficult to characterize the solutions and to predict when they will work well for a new problem.

The recurrent activity predictor described herein employs both the local features and context features to make activity predictions. Local features are computed from a recent sensor event window, and context features capture the activity predictions from a small history window. An advantage of the recurrent activity predictor compared to the graphical model solution described above, is that it allows for arbitrary relationships between activities and the temporal structure between activities as context features and is highly efficient in terms of training and testing.

Example Activity Prediction Server

Figure 4:
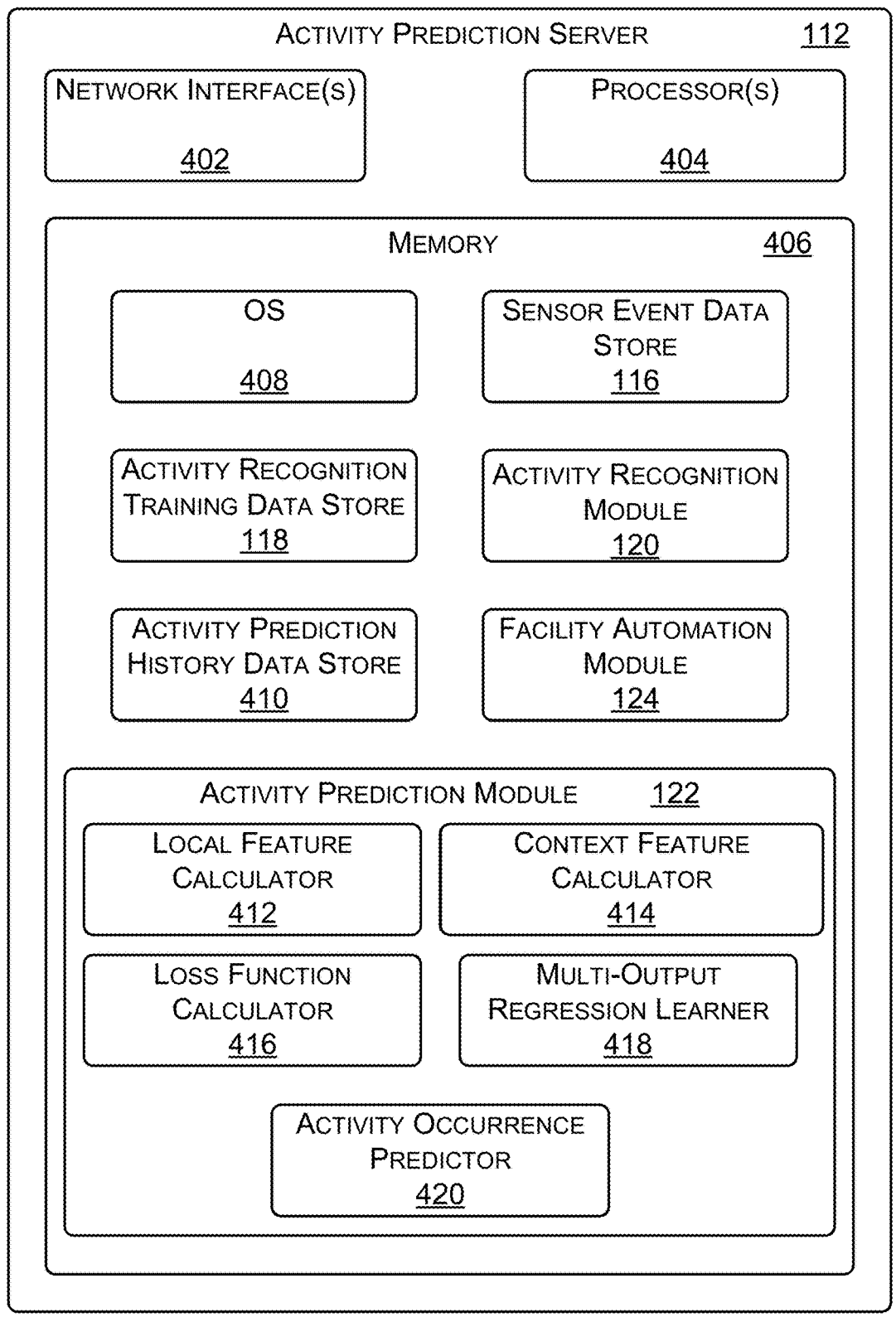
FIG. 4 is a block diagram illustrating select components of an example activity prediction server implemented to support data-driven activity prediction within a smart environment.

FIG. 4 illustrates example components of an activity prediction server 112 implemented to support activity prediction within a smart environment. Example activity prediction server 112 includes network interface(s) 402, processor(s) 404, and memory 406. Network interface(s) 402 enable activity prediction server 112 to receive and/or send data over a network, for example, as illustrated and described above with reference to FIG. 1. Processor(s) 404 are configured to execute computer-readable instructions to perform various operations. Computer-readable instructions that may be executed by the processor(s) 404 are maintained in memory 406, for example, as various software modules.

In an example implementation, memory 406 may maintain any combination or subset of components including, but not limited to, operating system 408, sensor event data store 116, activity recognition training data store 118, activity recognition module 120, activity prediction module 122, activity prediction history data store 410, and facility automation module 124.

Sensor event data store 116 may be implemented to store data that is received from one or more sensors implemented in one or more smart environments. As described above with reference to FIG. 1, activity recognition training data store 118 may be implemented to store labeled sensor data received from one or more smart environments, which can be used to train the activity recognition module 120.

Activity recognition module 120 is configured to receive sensor events from sensors in a smart environment, and to label the sensor events with corresponding activity class labels.

Activity prediction module 122 is configured to predict next occurrence times for one or more activities within a smart environment.

Facility automaton module 124 is configured to automatically control one or more aspects of smart environment 102 based, at least in part, on the predicted activity occurrence times.

Activity prediction module 122 includes local feature calculator 412, context feature calculator 414, loss function calculator 416, multi-output regression learner 418, and activity occurrence predictor 420.

In an example implementation, activity occurrence predictor 420 is a recurrent activity predictor that is trained based, at least in part, on imitation learning. Imitation learning is a training technique in which the goal of the learner is to learn to imitate the behavior of an expert performing a sequential decision making task (e.g., playing a video game) in a way that generalizes to similar tasks or situations. Typically this is done by collecting a set of trajectories of the expert's behavior (e.g., games played by the expert) on a set of training tasks. Then, supervised learning is applied to train a predictor that can replicate the decisions made on those trajectories. Often the supervised learning problem corresponds to learning a mapping from states to actions and any of a variety of classification tools can be used.

In an example implementation, activity prediction module 122 trains the activity occurrence predictor 420 according to an imitation learning technique such that the expert corresponds to the loss function, L, and the expert behavior corresponds to predicting the best output, $y_i^* \in \mathfrak{R}^T$, at each time step, i. To make predictions, the activity predictor uses both local features, $\Psi_{local}(i)=\Phi(\lambda_i)$, and prediction context features, $\Psi_{context}(i)$, including the previous activity predictions from a small history window. The context features may include, for example, the predicted occurrence times, $\hat{y} \in \mathfrak{R}^T$, for the T activities and for each history window. Given a history context of H previous windows, the context feature vector will be of size H·T.

Local feature calculator 412 determines local features from sensor event data store 116. Context feature calculator 414 determines context features from activity prediction history data store 410. Loss function calculator 416 calculates the loss function, L, based on training data that includes previous predictions and corresponding actual activity times. Multi-output regression learner 418 trains the activity occurrence predictor 420 using the local features, the context features, and the loss function.

Both the independent activity predictor and the recurrent activity predictor are trained using a multi-output regression learner. In various implementations, any of various multi-output regression learners may be used. In an example implementation, an independent regression function is learned for each output variable. That is, T regressors are learned, one for each of the T activities. In an example implementation, each regressor is implemented as a regression tree (e.g., a model tree), such that predictions are made by a learned linear function over all of the features at each leaf node.

Example Training and Prediction Operation

Figure 5:
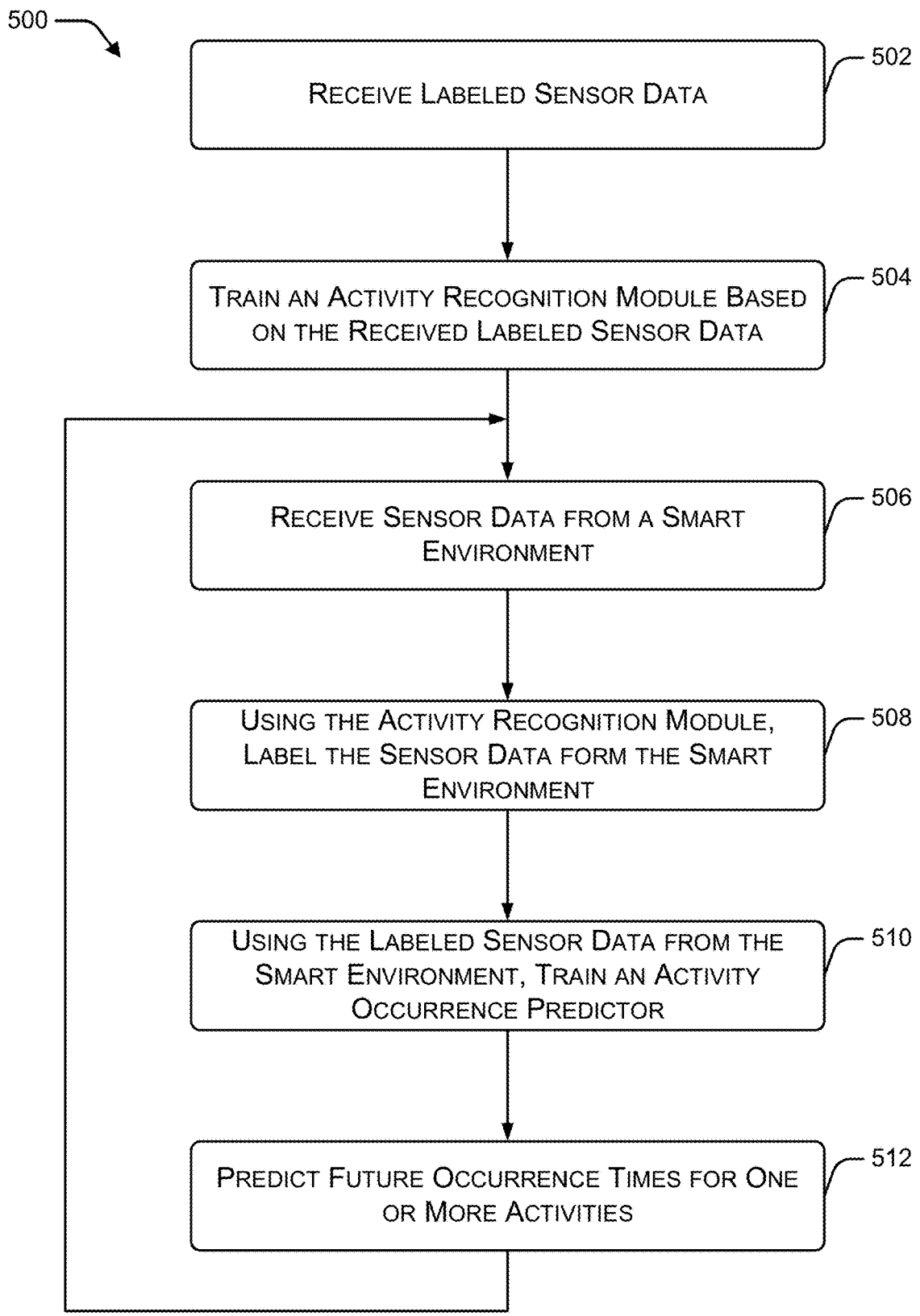
FIG. 5 is a flow diagram of an example process for performing data-driven activity prediction within a smart environment.
Figure 6:
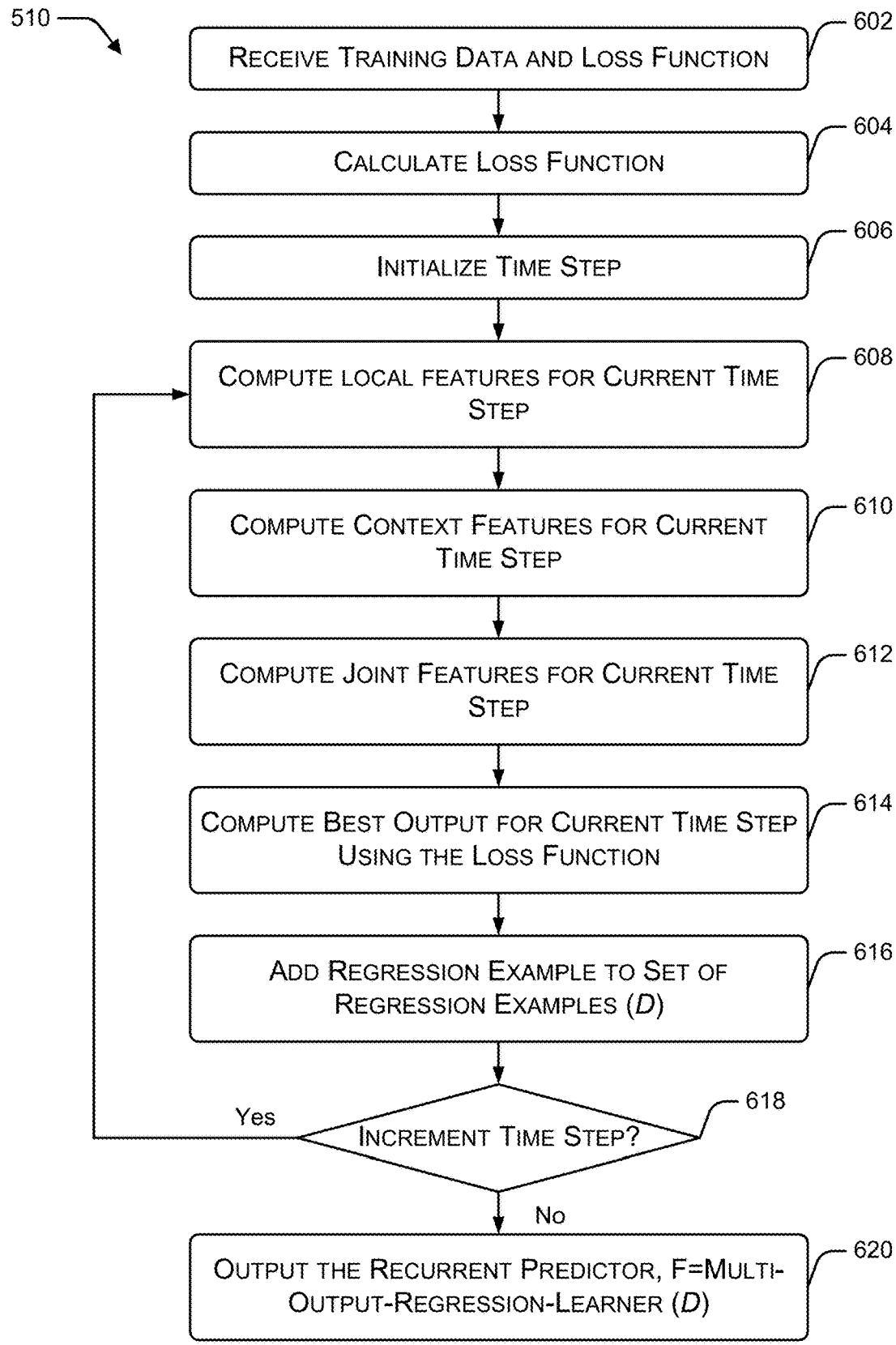
FIG. 6 is a flow diagram of an example process for training an activity occurrence predictor.

FIGS. 5 and 6 illustrate example processes for implementing data-driven activity prediction as described herein. These processes are illustrated as collections of blocks in logical flow graphs, which represent sequences of operations that can be implemented in hardware, software, or a combination thereof. In the context of software, the blocks represent computer-executable instructions stored on one or more computer storage media that, when executed by one or more processors, cause the processors to perform the recited operations. Note that the order in which the processes are described is not intended to be construed as a limitation, and any number of the described process blocks can be combined in any order to implement the processes, or alternate processes. Additionally, individual blocks may be deleted from the processes without departing from the spirit and scope of the subject matter described herein. Furthermore, while these processes are described with reference to the computing device 112 described above with reference to FIG. 4, other computer architectures may implement one or more portions of these processes, in whole or in part.

FIG. 5 illustrates an example process 500 for performing data-driven activity prediction for a smart environment.

At block 502, labeled sensor data is received. For example, as described above with reference to FIG. 1, activity recognition training data store maintains sensor event data that was generated in an one or more smart environments, with each sensor event labeled with an activity class that corresponds to an activity that was occurring at the time the sensor event was recorded.

At block 504, an activity recognition module is trained based on the received labeled sensor data. For example, activity recognition module 120 is trained using the data in activity recognition training data store 118 to enable activity recognition based on newly received sensor event data from a particular smart environment 102.

At block 506, sensor data is received from a smart environment. For example, sensor event data is received over network 114 from smart environment 102.

At block 508, activity recognition module 120 labels the sensor event data that is received from the smart environment 102 and stores the labeled sensor data in sensor event data store 116.

At block 510, activity prediction module 122 trains an activity occurrence predictor 420 based, at least in part on the labeled sensor data in sensor event data store 116.

At block 512, future occurrence times are predicted for one or more activities. For example, activity occurrence predictor analyzes the labeled sensor event data in sensor event data store 116 and predicts future occurrence times for one or more activities within smart environment 102.

FIG. 6 illustrates an example process 510 for training an activity occurrence predictor.

At block 602, training data is received. For example, activity prediction module 122 receives labeled sensor event data from sensor event data store 116. In an example implementation, activity occurrence predictor 420 is trained using a sequence of raw sensor events, $\Lambda=(\lambda_1, \lambda_2, \ldots \lambda_N)$, where $\Lambda$ corresponds to sensor readings generated at time $t_i$. As described above, as sensor event data is received, activity recognition module 120 labels each sensor event with a corresponding activity class.

At block 604, a loss function is calculated. For example, loss function calculator 416 analyzes the labeled sensor event data and calculates a non-negative loss function, L, such that $L(x, \hat{y}, y^*) \in \mathfrak{R}^+$ is the loss associated with labeling a particular input $x \in \mathfrak{R}^d$ by output $\hat{y} \in \mathfrak{R}^T$ when the true output is $y^* \in \mathfrak{R}^T$. In an example implementation, the loss function is the root mean squared error (RMSE), which can be expressed as:

$$L = RMSE = \sqrt{\frac{\sum (\hat{y}_i - y_i^*)^2}{T}},$$

where T is the number of activities. The goal is to train an activity predictor that generates predicted outputs that have low expected loss.

At block 606, a time step is initialized. For example, a first window is determined to define a time period for a first set of labeled sensor event data.

At block 608, local features are determined for the current time step. For example, local feature calculator 412 extracts data from sensor event data store 116 and employs a feature function, $\Phi$, to determine local features, $\Psi_{local}(i)=\Phi(\lambda_i)\in \mathfrak{R}^d$.

At block 610, context features are determined for the current time step. For example, context feature calculator 414 analyzes activity prediction history data store to determine prediction context features, $\Psi_{context}(i)$, including the previous activity predictions from a small history window. The context features may include, for example, the predicted occurrence times, $\hat{y}\in\mathfrak{R}^T$, for the T activities and for each history window. Given a history context of H previous windows, the context feature vector will be of size H·T.

In an example implementation, for exact imitation training, context features consist of ground-truth labels from the previous window. In various implementations, a variety of context features may be used. Example context features may include any combination of one or more of the features listed and described in Table 1.

TABLE 1

| ID | Feature | Description |
|---|---|---|
| 1 | LastSensorEventHours | Hour of day for current event |
| 2 | LastSensorEventSeconds | Seconds since the beginning of the day for the current event |
| 3 | WindowDuration | Window duration (seconds) |
| 4 | TimeSinceLastSensorEvent | Seconds since previous event |
| 5 | PrevDominantSensor1 | Most frequent sensor in the previous window |
| 6 | PrevDominantSensor2 | Most frequent sensor in the window before the previous window |
| 7 | LastSensorID | Current event sensor |
| 8 | LastLocation | Most recent location sensor |
| 9 | SensorCount | Number of events in the window for each sensor |
| 10 | SensorElTime | Time since each sensor fired |
| 11 | Time Stamp | Normalized time since beginning of the day |
| 12 | LaggedTimeStamp | Previous event TimeStamps |
| 13 | LaggedPredictions | Previous event predictions |
| 14 | MaximumValue | Maximum value of sensor |
| 15 | MinimumValue | Minimum value of sensor |
| 16 | Sum | Sum of sensor values |
| 17 | Mean | Mean of sensor values |
| 18 | MeanAbsoluteDeviation | Average difference from mean |
| 19 | MedianAbsoluteDeviation | Average difference from median |
| 20 | StandardDeviation | Value standard deviation |
| 21 | CoeffVariation | Coefficient of value variation |
| 22 | NumZeroCrossings | Number of median crossings |
| 23 | Percentiles | Number below which a percentage of values fall |
| 24 | SqSumPercentile | Square sum values < percentile |
| 25 | InterQuartileRange | Difference between 25th and 75th percentiles |
| 26 | BinCount | Values binned into 10 bins |
| 27 | Skewness | Symmetry of values |
| 28 | Kurtosis | Measure of value "peakedness" |
| 29 | SignalEnergy | Sum of squares of values |
| 30 | LogSignalEnergy | Sum of logs of squares |
| 31 | SignalPower | SignalEnergyAverage |
| 32 | PeakToPeak | Maximum-minimum |
| 33 | AvgTimeBetweenPeaks | Time between local maxima |
| 34 | NumPeaks | Number of Peaks |

At block 612, joint features for the current time step are computed. For example, activity prediction module determines the joint features, which are expressed as $\Psi_i=\Psi_{local}(i)\oplus\Psi_{context}(i)$, where "$\oplus$" refers to the vector concatenation operator.

At block 614, the best output for the current time step is determined, based, at least in part, on the loss function. For example, multi-output regression learner 418 determines the best activity predictions, which can be represented as $y_i^*\in\mathfrak{R}^T$.

At block 616, the current regression example, $(\Psi_i, y_i^*)$ is added to a set of regression examples, D.

At block 618, activity prediction module 122 determines whether or not to increment the time step. For example, the processing described above with regard to blocks 608-616 is performed for each window represented by the training data. If all of the training data has not yet been processed, then at block 618, the time step is incremented and processing continues as described above with reference to block 608 (the "Yes" branch from block 618). On the other hand, if all of the training data has been processed, then the time step is not incremented, and processing continues at block 620 (the "No" branch from block 618).

At block 620, the aggregate set of input-output pairs (i.e., $\{x_i, y_i^*\}_{i=1}^N$), which are the training examples, is given to multi-output regression learner 418 to learn the recurrent activity occurrence predictor 420 by minimizing the given loss function, L. A learned function, $\mathcal{F}$, that is consistent with these imitation training examples will generalize and perform well on new instances.

One potential challenge with exact imitation training is error propagation. That is, errors in early time steps can propagate to downstream decisions and can lead to poor global performance. If the error propagation problem arises, more advanced imitation learning algorithms (e.g., DAGGER) can be used to learn more robust predictors. For example, DAGGER is an iterative algorithm, known to those skilled in the art, that can be viewed as generating a sequence of predictors (one per iteration), where the first iteration corresponds to exact imitation training. In each subsequent iteration, DAGGER makes decisions with the predictor from the previous iteration, and generates additional training examples to learn to recover from any errors. A new predictor is learned from the aggregate set of training examples. The final predictor is selected based on a validation set. DAGGER also has positive theoretical properties and can be seen as a no-regret online learning algorithm.

In an example implementation, the learned recurrent activity predictor is deployed in a real-life application and the predictor is then adapted online based on feedback from users, and the DAGGER algorithm is used to naturally facilitate a life-long learning scenario.

Example Facility Automation Operation

Figure 7:
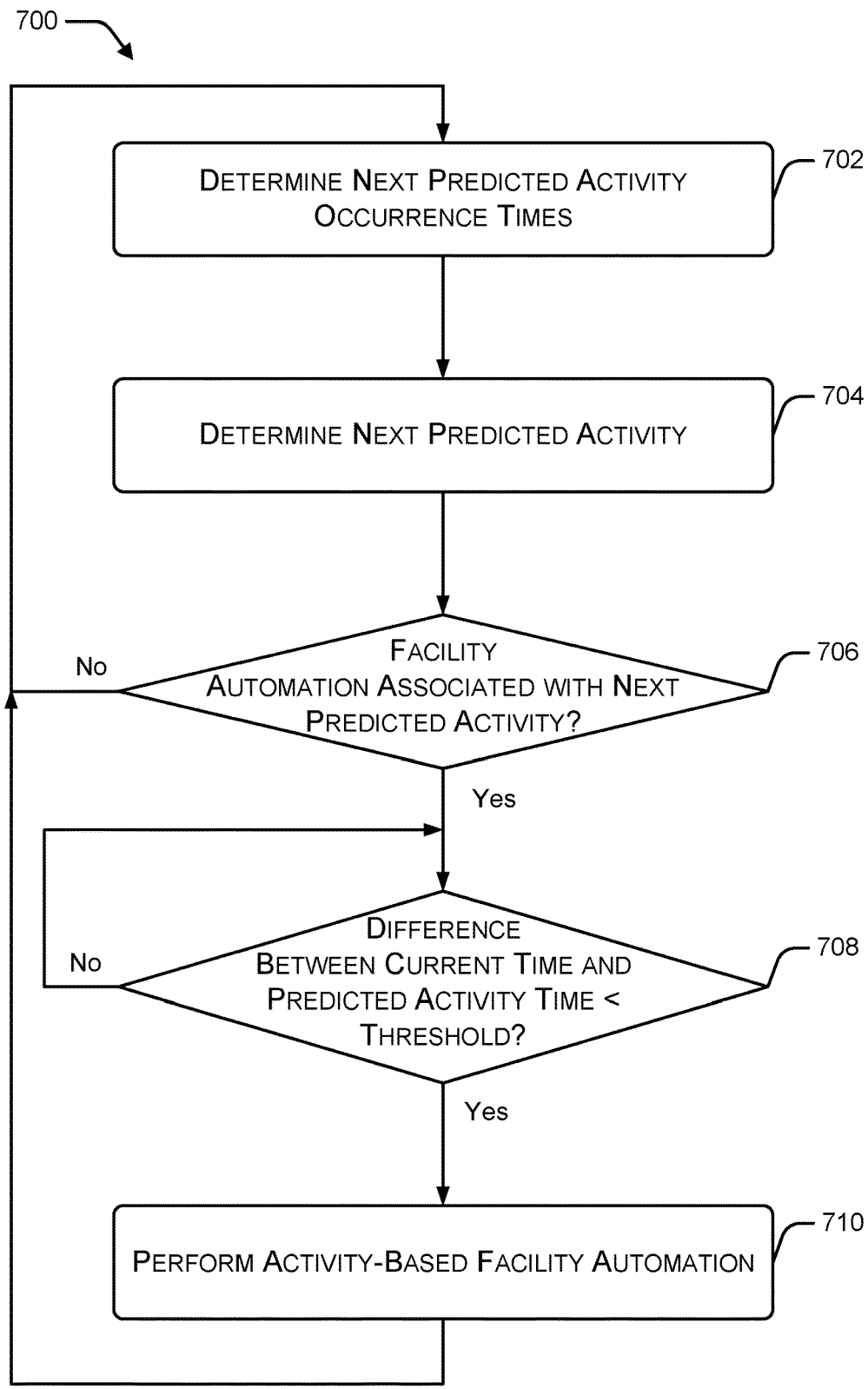
FIG. 7 is a flow diagram of an example process for performing facility automation based on data-driven activity prediction.

FIG. 7 illustrates an example process 700 for implementing facility automation based on data-driven activity prompting as described herein. The process is illustrated as a collection of blocks in a logical flow graph, which represents a sequence of operations that can be implemented in hardware, software, or a combination thereof. In the context of software, the blocks represent computer-executable instructions stored on one or more computer storage media that, when executed by one or more processors, cause the processors to perform the recited operations. Note that the order in which the process is described is not intended to be construed as a limitation, and any number of the described process blocks can be combined in any order to implement the process, or alternate processes. Additionally, individual blocks may be deleted from the process without departing from the spirit and scope of the subject matter described herein. Furthermore, while this process is described with reference to the computing device 112 described above with reference to FIG. 4, other computer architectures may implement one or more portions of these processes, in whole or in part.

At block 702, one or more next predicted activity occurrence time are determined. For example, activity prediction module 122 analyzes labeled sensor event data to determine predicted next activity occurrence times.

At block 704, the next predicted activity is determined. For example, facility automation module 124 analyzes the predicted next activity occurrence times to determine the next activity having the soonest future predicted activity occurrence time.

At block 706, it is determined whether or not the next predicted activity has an associated facility automation. For example, some predicted activities may have an associated facility automation (e.g., turning on lights or adjusting temperature for bed-to-toilet transition, enter home, leave home, relax, or sleep), while other predicted activities may not have an associated facility automation (e.g., eat, personal hygiene, wash dishes, or work may not have an associated facility automation).

If it is determined that the next predicted activity does not have an associated facility automation (the "No" branch from block 706), then processing continues as described above with reference to block 702.

On the other hand, if it is determined that the next predicted activity does have an associated facility automation (the "Yes" branch from block 706), then at block 708, a difference between the current time and the predicted next occurrence time of the determined next activity is compared to a threshold value. In an example implementation, different activities may have different threshold values.

If it is determined that the current time is not within a threshold time period of the predicted next activity occurrence (the "No" branch from block 708), then processing continues at block 708. On the other hand, when it is determined that the current time is within the threshold time period of the predicted next activity occurrence (the "Yes" branch from block 708), then at block 710, the facility automation associated with the next predicted activity is performed. For example, lights may be turned on or off or temperature may be adjusted in anticipation of the next predicted activity.

Example Personal Computing Device for Activity Prompting

Figure 8:
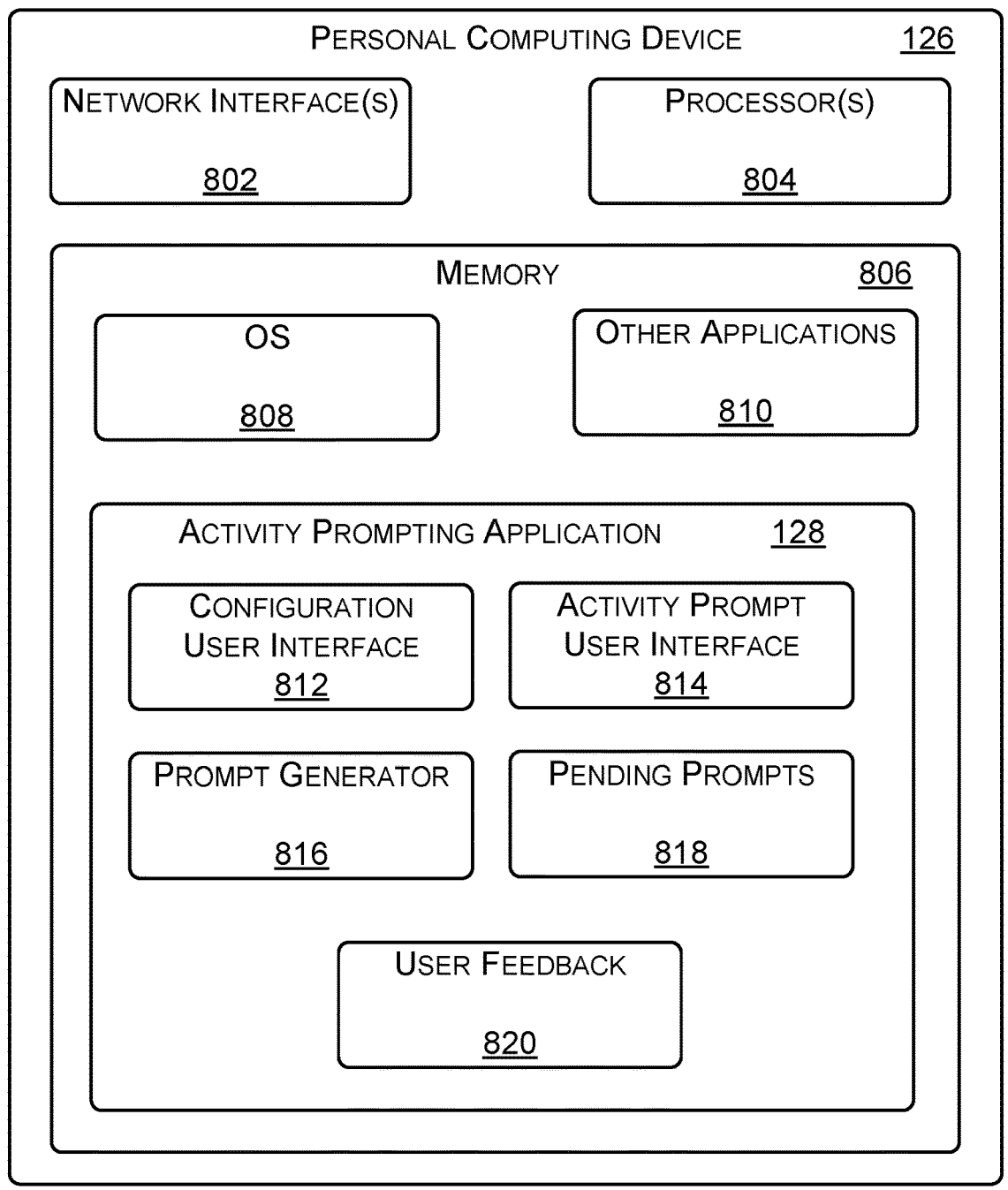
FIG. 8 is a block diagram illustrating select components of an example personal computing device implemented to support data-driven activity prompting.

FIG. 8 illustrates example components of a personal computing device 126 implemented to support activity prompting within a smart environment. Example personal computing device 126 may be implemented as a desktop computer, a laptop computer, a tablet computer, a mobile phone, or any other network-enabled personal computing device.

Example personal computing device 126 includes network interface(s) 802, processor(s) 804, and memory 806. Network interface(s) 802 enable personal computing device 126 to receive and/or send data over a network, for example, as illustrated and described above with reference to FIG. 1. Processor(s) 804 are configured to execute computer-readable instructions to perform various operations. Computer-readable instructions that may be executed by the processor(s) 804 are maintained in memory 806, for example, as various software modules.

In an example implementation, memory 806 may maintain any combination or subset of components including, but not limited to, operating system 808, activity prompting application 128, and other applications 810.

Activity prompting application 128 may include, for example, configuration user interface 812, activity prompt user interface 814, prompt generator 816, pending prompts 818, and user feedback 820.

In an example, configuration user interface 812 may be configured to enable a user to set one or more preferences. For example, a user may be allowed to specify specific activities for which they do or do not wish to receive prompts. As another example, a user may be allowed to specify a relative time at which they would like to receive a prompt. For example, a user may specify that they want to be prompted no more than five minutes before the predicted activity time. A user may also be able to specify a sound and/or visual indicator to be presented as part of the activity prompt.

Activity prompt user interface 814 enables presentation of an activity prompt. In an example, an activity prompt may include any combination of a visual prompt, an audio prompt, a tactile prompt (e.g. vibration of a mobile phone), and a user feedback mechanism.

Prompt generator 816 is configured to receive activity occurrence predictions from activity prediction server 112, and generate prompts to be presented to a user of the personal computing device 126. Prompt generator 816 generates a prompt and determines a time at which the prompt is to be presented. Prompts that are to be presented at a later time are stored in pending prompts store 818 until the time at which they are to be presented.

User feedback store 820 stores data received from a user in response to an activity prompt. For example, as illustrated in FIG. 3, a user may provide feedback indicating they have already done the activity, they are doing the activity now, they will do the activity later, or that they are choosing to ignore the activity prompt. User feedback in response to activity prompts can be used to modify prompt configuration settings and/or to improve the accuracy of future activity occurrence predictions.

Example Activity Prompting Operation

Figure 9:
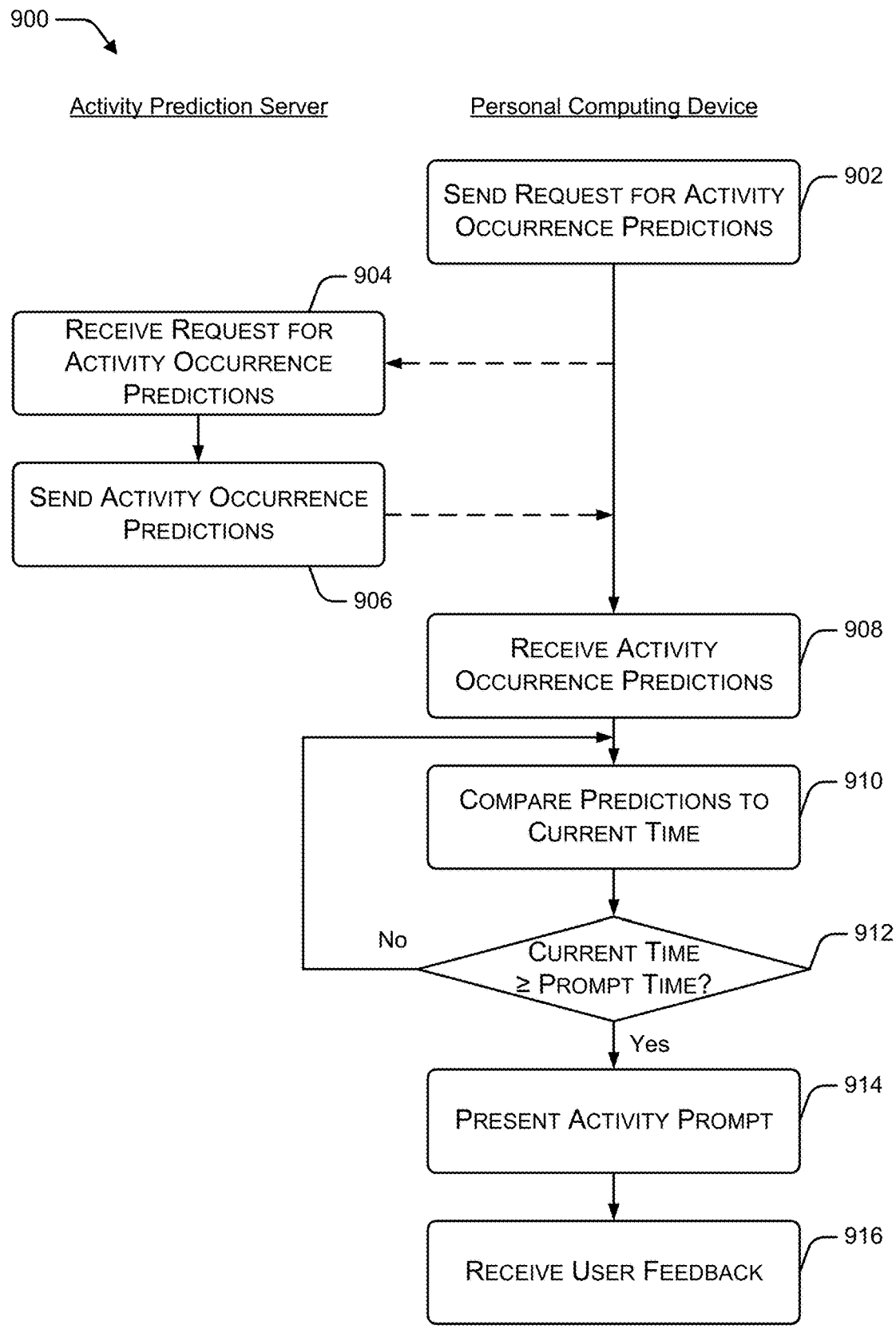
FIG. 9 is a flow diagram of an example process for performing data-driven activity prompting.

FIG. 9 illustrates an example process 900 for implementing data-driven activity prompting as described herein. The process is illustrated as a collection of blocks in a logical flow graph, which represents a sequence of operations that can be implemented in hardware, software, or a combination thereof. In the context of software, the blocks represent computer-executable instructions stored on one or more computer storage media that, when executed by one or more processors, cause the processors to perform the recited operations. Note that the order in which the process is described is not intended to be construed as a limitation, and any number of the described process blocks can be combined in any order to implement the process, or alternate processes. Additionally, individual blocks may be deleted from the process without departing from the spirit and scope of the subject matter described herein. Furthermore, while this process is described with reference to the computing device 112 and personal computing device 126 described above with reference to FIGS. 4 and 8, other computer architectures may implement one or more portions of these processes, in whole or in part.

At block 902, activity prompting application 128 sends to activity prediction server 112, a request for activity occurrence predictions. In an example implementation, activity prompting application 128 is configured to send activity prediction requests periodically (e.g., every 15 minutes or other, possibly configurable, time period).

At block 904, activity prediction server 112 receives the request from the personal computing device 126. For example, the request is received over the network 114.

At block 906, activity prediction server 112 sends the requested activity occurrence predictions to the personal computing device 126. For example, the activity occurrence predictions are sent over the network 114. In an example implementation, activity occurrence predictions may be sent for specifically requested activities, for all activities, for any activities for which the current occurrence prediction has not yet been sent, and so on.

At block 908, personal computing device 126 receives activity occurrence predictions from the activity prediction server 112, for example, over the network 114.

At block 910, the activity prompting application 128 compares the received predictions to the current time. For example, prompt generator 816 generates a prompt to be presented, and determines a time at which the prompt is to be presented. The time at which the prompt is to be presented may be based, for example, on a comparison of the current time and the predicted activity occurrence time.

At block 912, it is determined, for each pending prompt, whether or not the current time is greater than or equal to the prompt time. If the current time is not greater than or equal to the prompt time (the "No" branch from block 912), then processing continues as described above with reference to block 910. However, if the current time is greater than or equal to the prompt time (the "Yes" branch from block 912), then at block 914, the activity prompt is presented. For example, activity prompt user interface 814 is invoked to present one or more pending activity prompts.

At block 916, user feedback associated with the prompt may be received. For example, a user may indicate if they have already performed the activity associated with the prompt, a user may indicate that they are ignoring the prompt, a user may indicate that they do not want to be prompted for this particular activity, a user may indicate they do not want to be prompted at this particular time of day, and so on. Any of various types of user feedback may be enabled for a particular activity prompt.

User feedback may be used, for example, by the activity prompting application to configure user settings. For example, feedback indicating that the user is ignoring the prompt or does not wish to receive prompts at a particular time of day can be used to update a user-configurable setting that defines periods of time when the user does not want to be disturbed with activity prompts.

As another example, user feedback may be sent to the activity prediction server 112 and used to improve the training of the activity occurrence predictor 420. For example, if user feedback frequently indicates that the activity has already been performed, then the activity occurrence predictor 420 may be retrained to improve the accuracy of the activity predictions.

CONCLUSION

Data-driven activity occurrence prediction recognition within smart environments may be implemented based on data resulting from known activity recognition techniques. Predicting future occurrence times for activities with a smart environment also facilitates activity prompting which can be effective in encouraging consistent behaviors or even modifying behaviors of individuals within a smart environment.

Although the subject matter has been described in language specific to structural features and/or methodological operations, it is to be understood that the subject matter defined in the appended claims is not necessarily limited to the specific features or operations described. Rather, the specific features and acts are disclosed as example forms of implementing the claims.

What is claimed is:

1. A method comprising:
   for a cognitively-impaired individual living within a smart home environment, determining an activity of interest;
   querying an activity prediction server for a predicted future time associated with the activity of interest;
   receiving, from the activity prediction server, the predicted future time associated with the activity of interest;
   comparing the predicted future time to a current time; and
   when the current time is equal to or greater than the predicted future time, presenting an activity prompt associated with the activity of interest, wherein the activity prediction server is trained based on:
   defining a number of labeled sensor event data based on sensor readings;
   determining a number of local features of the labeled sensor event data, the number of local features being computed from a sensor event window; and
   determining a number of context features associated with the labeled sensor event data, the context features capturing a number of activity predictions from a history window, wherein the context features are defined based on a set of the activity predictions and a plurality of the number of local features,
   wherein training the activity prediction server comprises:
   extracting the number of local features from the labeled sensor event data;
   training a multi-output regression learner by:
   training a first machine learning model for the activity of interest using the number of local features to create a first trained machine learning model;
   predicting times for the activity of interest using the first trained machine learning model;
   extracting context features using the number of local features and predicted times for the activity of interest; and
   training a second machine learning model for the activity of interest using the context features to create a second trained machine learning model,
   wherein the first machine learning model and the second machine learning model are trained based in part on a dataset aggregation (Dagger) algorithm enhanced with an aggregated imitation training.

2. The method of claim 1, wherein the presentation of the activity prompt is based on user-defined preferences defining a relative time at which the activity prompt is to be presented.

3. The method of claim 1, wherein the presentation of the activity prompt is based on user-defined preferences defining whether a visual indicator, audio indicator, tactile indicator, or combinations thereof are to be presented as part of the activity prompt.

4. The method of claim 1, wherein querying the activity prediction server includes periodically querying the activity prediction server.

5. The method of claim 1, wherein determining the activity of interest includes one or more of:
   determining an activity specified in association with user-configured settings;
   determining an activity for which no activity prompts are currently pending; or determining an activity for which an activity prompt is currently pending and is schedule to be presented within a threshold time period.

6. The method of claim 1, further including:
receiving user feedback indicating an action taken by a user in response to the activity prompt; and
determining an effectiveness of the activity prompt for the user based on the user feedback.

7. The method of claim 6, wherein the user feedback includes an indication from the user that the user has performed the activity, the user is going to perform the activity, the user will perform the activity at a later time, or the user is choosing to ignore the activity.

8. The method of claim 6, wherein the user feedback is used to improve an accuracy of a future activity occurrence prediction.

9. The method of claim 6, further including:
sending the user feedback to the activity prediction server; and
with the activity prediction server, retraining an activity occurrence predictor based on the user feedback.

10. A method comprising:
for a cognitively-impaired individual living within a smart home environment:
training an activity recognition module of an activity prediction server based on a set of activity recognition training data to create a trained activity recognition module;
receiving sensor events from an environment; using the trained activity recognition module to label the sensor events with an activity class to generate labeled sensor event data;
training an activity occurrence predictor based, at least in part, on the labeled sensor event data;
using the activity occurrence predictor to predict a future occurrence time of an activity within the environment;
presenting, on a user interface, an activity prompt associated with the activity in response to a current time being equal to or greater than the predicted future occurrence time;
receiving user feedback via the user interface indicating an action taken by a user in response to the activity prompt; and
retraining the activity occurrence predictor based on the user feedback, wherein the activity prediction server is trained based on:
defining a number of labeled sensor event data based on sensor readings;
determining a number of local features of the labeled sensor event data, the number of local features being computed from a sensor event window; and
determining a number of context features associated with the labeled sensor event data, the number of context features capturing a number of activity predictions from a history window, wherein the number of context features are defined based on a set of the activity predictions and a plurality of the number of local features,
wherein training the activity prediction server comprises:
extracting the number of local features from the labeled sensor event data;
training a multi-output regression learner by:
training a first machine learning model for an activity of interest using the number of local features to create a first trained machine learning model;
predicting times for the activity of interest using the first trained machine learning model;

extracting the number of context features using the number of local features and predicted times for the activity of interest; and
training a second machine learning model for the activity of interest using the number of context features to create a second trained machine learning model,
wherein the first machine learning model and the second machine learning model are trained based in part on a dataset aggregation (Dagger) algorithm enhanced with an aggregated imitation training.

11. The method of claim 10, wherein:
the set of activity recognition training data includes a plurality of sensor events, and
the sensor events are labeled with a corresponding activity class.

12. The method of claim 10, wherein the presentation of the activity prompt is based on user-defined preferences defining a relative time at which the activity prompt is to be presented.

13. The method of claim 10, wherein the user feedback includes an indication from the user that the user has performed the activity, the user is going to perform the activity, the user will perform the activity at a later time, or the user is choosing to ignore the activity.

14. The method of claim 13, wherein retraining the activity occurrence predictor based on the user feedback includes using the user feedback to improve an accuracy of a future activity occurrence prediction.

15. A computing device comprising:
a processor;
a memory communicatively coupled to the processor; and
an activity prompting application stored in the memory and executed on the processor, to configure the computing device to:
determine an activity of interest, the activity of interest including activities of daily living (ADLs) for a cognitively-impaired individual living within a smart home environment;
query an activity prediction server for a predicted future time associated with the activity of interest;
receive, from the activity prediction server, the predicted future time associated with the activity of interest;
compare the predicted future time to a current time; and
when the current time is equal to or greater than the predicted future time, present an activity prompt associated with the activity of interest based on user-defined preferences defining whether the activity prompt is to be presented for the activity of interest,
wherein the activity prediction server is trained based on:
defining a number of labeled sensor event data based on sensor readings;
determining a number of local features of the labeled sensor event data, the number of local features being computed from a sensor event window; and
determining a number of context features associated with the labeled sensor event data, the number of context features capturing a number of activity predictions from a history window, wherein the number of context features are defined based on a set of the activity predictions and a plurality of the number of local features,
wherein training the activity prediction server comprises:
extracting the number of local features from the labeled sensor event data;

training a multi-output regression learner by:
  training a first machine learning model for the activity of interest using the number of local features to create a first trained machine learning model;
  predicting times for the activity of interest using the first trained machine learning model;
  extracting the number of context features using the number of local features and predicted times for the activity of interest; and
  training a second machine learning model for the activity of interest using the number of context features to create a second trained machine learning model,
  wherein the first machine learning model and the second machine learning model are trained based in part on a dataset aggregation (Dagger) algorithm enhanced with an aggregated imitation training.

16. The computing device of claim 15, wherein the processor periodically queries the activity prediction server.

17. The computing device of claim 15, wherein the presentation of the activity prompt is based on user-defined preferences defining a relative time at which the activity prompt is to be presented.

18. The computing device of claim 15, wherein the presentation of the activity prompt is based on user-defined preferences defining whether a visual indicator, audio indicator, tactile indicator, or combination thereof are to be presented as part of the activity prompt.

19. The computing device of claim 15, wherein the processor receives user feedback indicating an action taken by a user in response to the activity prompt, and
  wherein the user feedback includes an indication from the user that the user has performed the activity, the user is going to perform the activity, the user will perform the activity at a later time, or the user is choosing to ignore the activity.

20. The computing device of claim 15, further comprising:
  calculating a loss function defining a loss associated with the labeled sensor event data to define an error of the second machine learning model; and
  using a multi-output regression learner to train an activity occurrence predictor of the activity prediction server based on the number of local features and the number of context features to minimize the loss function.

21. The method of claim 1, wherein the presentation of the activity prompt is based on user-defined preferences defining whether the activity prompt is to be presented for the activity of interest.

* * * * *